United States Patent
Chandra et al.

(10) Patent No.: US 11,375,398 B2
(45) Date of Patent: Jun. 28, 2022

(54) MODULAR, RELIABLE WIRELESS CLIENT DEVICE

(71) Applicant: Cisco Technology, Inc., San Jose, CA (US)

(72) Inventors: Rupak Chandra, Fremont, CA (US); Sudhir Kumar Jain, Fremont, CA (US); Veselin Ganev, Milpitas, CA (US); Prithvi Manduva, Milpitas, CA (US); Muhammad Arif Shamim, Milpitas, CA (US); Patrick Jean Marc Grossetete, Marcoussis (FR)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 16/680,684

(22) Filed: Nov. 12, 2019

(65) Prior Publication Data
US 2021/0144584 A1 May 13, 2021

(51) Int. Cl.
*H04W 28/04* (2009.01)
*H04W 76/15* (2018.01)
*H04W 84/12* (2009.01)

(52) U.S. Cl.
CPC .......... *H04W 28/04* (2013.01); *H04W 76/15* (2018.02); *H04W 84/12* (2013.01)

(58) Field of Classification Search
CPC . H04W 48/14; H04W 28/24; H04W 74/0816; H04W 48/16; H04L 63/0428
See application file for complete search history.

(56) References Cited

U.S. PATENT DOCUMENTS

| | | | |
|---|---|---|---|
| 6,332,077 B1 * | 12/2001 | Wu | H04W 8/08 370/331 |
| 7,336,670 B1 * | 2/2008 | Calhoun | H04L 63/14 370/252 |
| 8,934,420 B2 | 1/2015 | Sivaprakasam | |
| 9,277,534 B2 | 3/2016 | Yun et al. | |
| 9,380,642 B2 | 6/2016 | Periyalwar et al. | |
| 10,009,937 B2 | 6/2018 | de la Garrigue | |
| 10,194,308 B2 | 1/2019 | Lu et al. | |

(Continued)

OTHER PUBLICATIONS

U.S. Appl. No. 16/680,230, filed Nov. 11, 2019 Unpublished, Cisco Technology Inc.

(Continued)

*Primary Examiner* — Syed Ali
(74) *Attorney, Agent, or Firm* — Behmke Innovation Group; Kenneth J. Heywood; Jonathon P. Western

(57) ABSTRACT

In one embodiment, a client device having a plurality of radios obtains a list of basic service set identifiers (BSSIDs) for a plurality of wireless access points of a wireless network. The client device associates each of the plurality of radios of the client device with a different wireless access point of the wireless network, based on the obtained list of BSSIDs. The client device receives a copy of a data packet from a particular one of the associated wireless access points. Each of the associated wireless access points receives a replicated copy of the data packet to be transmitted towards the client device. The device causes the associated wireless access points to cease further transmission of their copies of the data packet by acknowledging receipt of the data packet to the particular wireless access point.

15 Claims, 8 Drawing Sheets

(56) References Cited

U.S. PATENT DOCUMENTS

| | | |
|---|---|---|
| 10,225,789 B2 | 3/2019 | Thubert et al. |
| 10,367,623 B2 | 7/2019 | Thubert et al. |
| 10,397,058 B2 | 8/2019 | Thubert et al. |
| 10,433,191 B2 | 10/2019 | Thubert et al. |
| 2015/0219742 A1* | 8/2015 | Castagnoli ............ H04W 4/029 370/336 |
| 2017/0013513 A1* | 1/2017 | Agarwal ............... H04W 24/02 |
| 2017/0127373 A1* | 5/2017 | Deshpande ........... H04W 64/00 |
| 2017/0272138 A1* | 9/2017 | Chun ................... H04W 74/006 |
| 2018/0343578 A1* | 11/2018 | Yeoh .................... H04W 24/10 |
| 2018/0359698 A1* | 12/2018 | Patwardhan .......... H04W 28/22 |
| 2019/0268892 A1* | 8/2019 | Gidvani ............ H04W 72/0406 |
| 2019/0326021 A1* | 10/2019 | Harrod, IV ........... H04W 24/00 |
| 2021/0036809 A1* | 2/2021 | Shellhammer ........ H04L 1/0013 |
| 2021/0120454 A1* | 4/2021 | Chennichetty ........ H04L 5/0007 |
| 2021/0204270 A1* | 7/2021 | Li ........................ H04B 7/0695 |
| 2021/0307099 A1* | 9/2021 | Ryu .......................... H04L 1/08 |
| 2021/0385779 A1* | 12/2021 | Oteri .................... H04W 60/04 |

OTHER PUBLICATIONS

U.S. Appl. No. 15/499,017, filed Apr. 27, 2017 Unpublished, Cisco Technology Inc.

U.S. Appl. No. 15/499,201, filed Apr. 27, 2017 Unpublished, Cisco Technology Inc.

U.S. Appl. No. 15/868,216, filed Jan. 11, 2018 Unpublished, Cisco Technology Inc.

Coronado et al., "Wi-Not: Exploiting Radio Diversity in Software—Defined 802.11—based WLANs", http://www.ict-coherent.eu/, Sep. 20, 2019, 4 pages.

\* cited by examiner

MODULAR, RELIABLE WIRELESS CLIENT DEVICE

TECHNICAL FIELD

The present disclosure relates generally to computer networks, and, more particularly, to a modular, reliable wireless client device.

BACKGROUND

Wireless networks are becoming more and more ubiquitous, with many businesses, schools, etc. now even offering Wi-Fi connectivity to guests. With respect to designing a wireless network, access points are typically installed at spots that maximize coverage. For example, access points may be spaced such that the received signal strength indicator (RSSI) measurement by a client at any point in the location will be above a certain threshold for at least one of the access points. Doing so ensures that a wireless client of the network will always have connectivity with the network. The deployment of access points may also take into account the expected client loads, with more access points being installed at locations in which a large number of clients are expected to be present.

While the above deployment approach works well in office settings, deploying a wireless network in an industrial setting poses additional challenges. For example, consider the case of a metal waste recycling yard in which large machinery is moving, such as cranes and trucks. In such a case, there may be heavy signal attenuation and/or signal blockages due to the presence of large metallic objects. In addition, movement of any of these metallic objects can also result in changing wireless conditions over time. Another example deployment setting that exhibits similar challenges is a factory floor that contains automated guided vehicles (AGVs), autonomous mobile robots (AMRs), other robotic equipment, cranes, assembly lines, or the like. Accordingly, a client device is introduced herein that can communicate with a wireless network in an industrial setting with a high degree of reliability.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
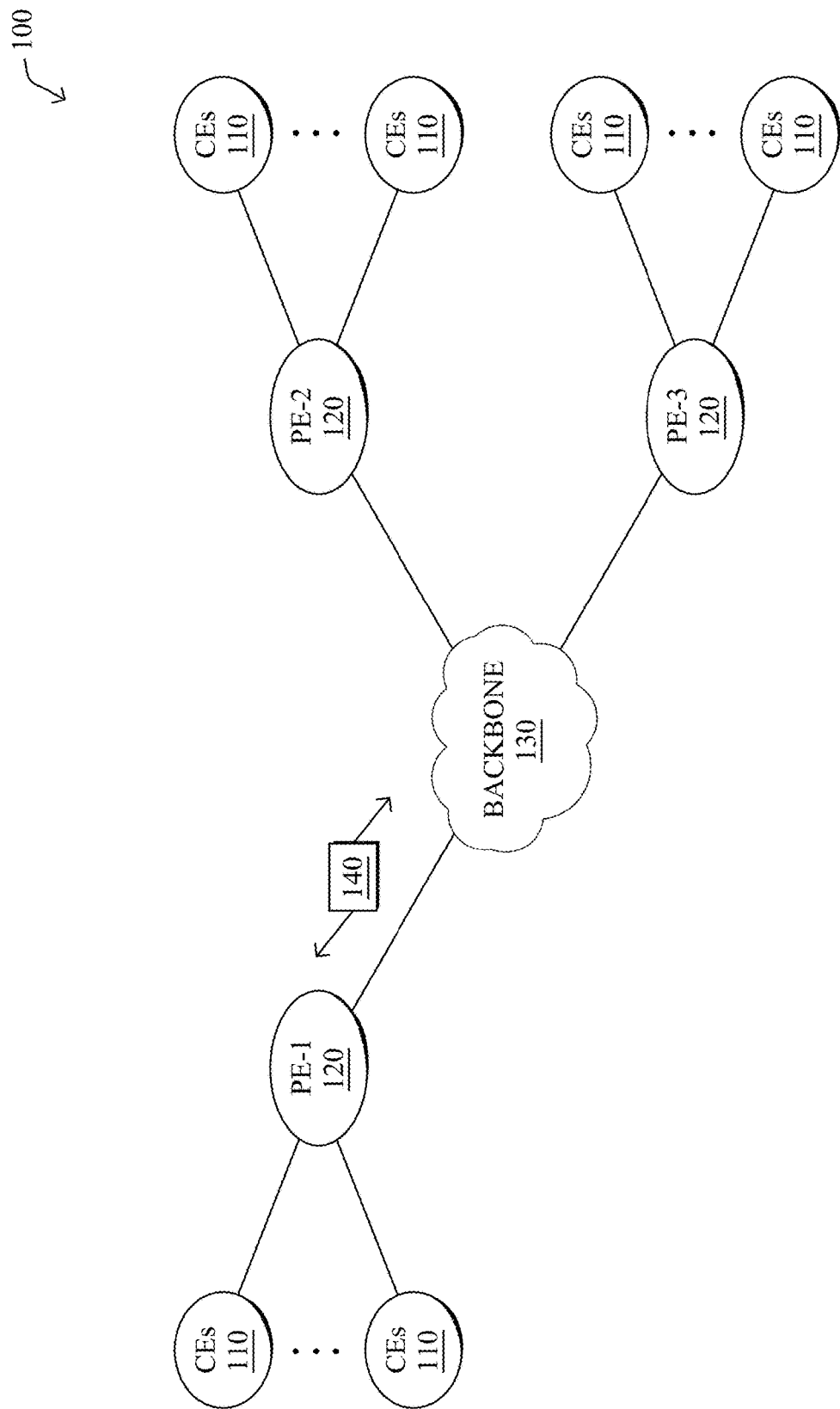
FIGS. 1A-1B illustrate an example communication network.

According to one or more embodiments of the disclosure, a client device having a plurality of radios obtains a list of basic service set identifiers (BSSIDs) for a plurality of wireless access points of a wireless network. The client device associates each of the plurality of radios of the client device with a different wireless access point of the wireless network, based on the obtained list of BSSIDs. The client device receives a copy of a data packet from a particular one of the associated wireless access points. Each of the associated wireless access points receives a replicated copy of the data packet to be transmitted towards the client device. The device causes the associated wireless access points to cease further transmission of their copies of the data packet by acknowledging receipt of the data packet to the particular wireless access point.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
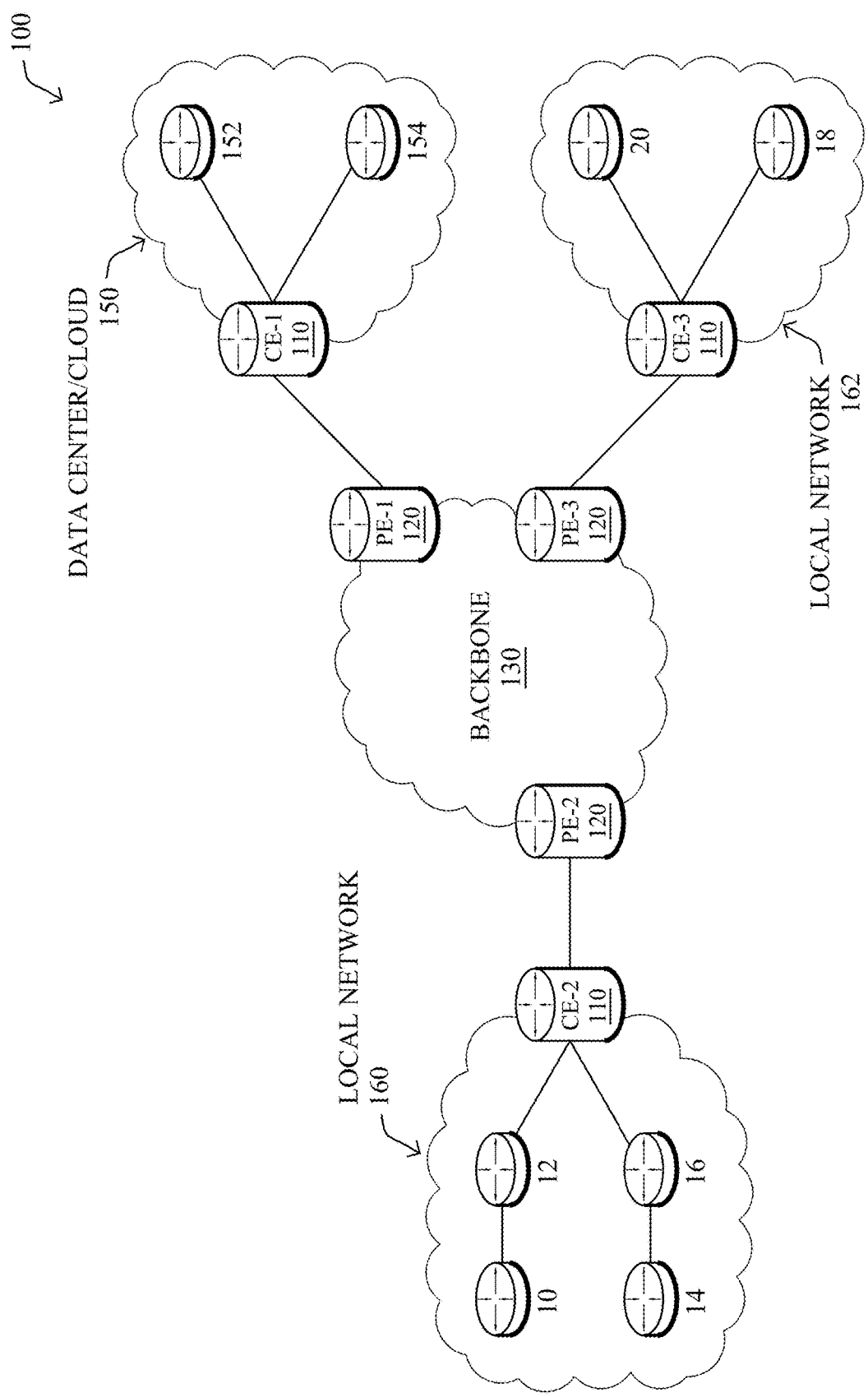

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
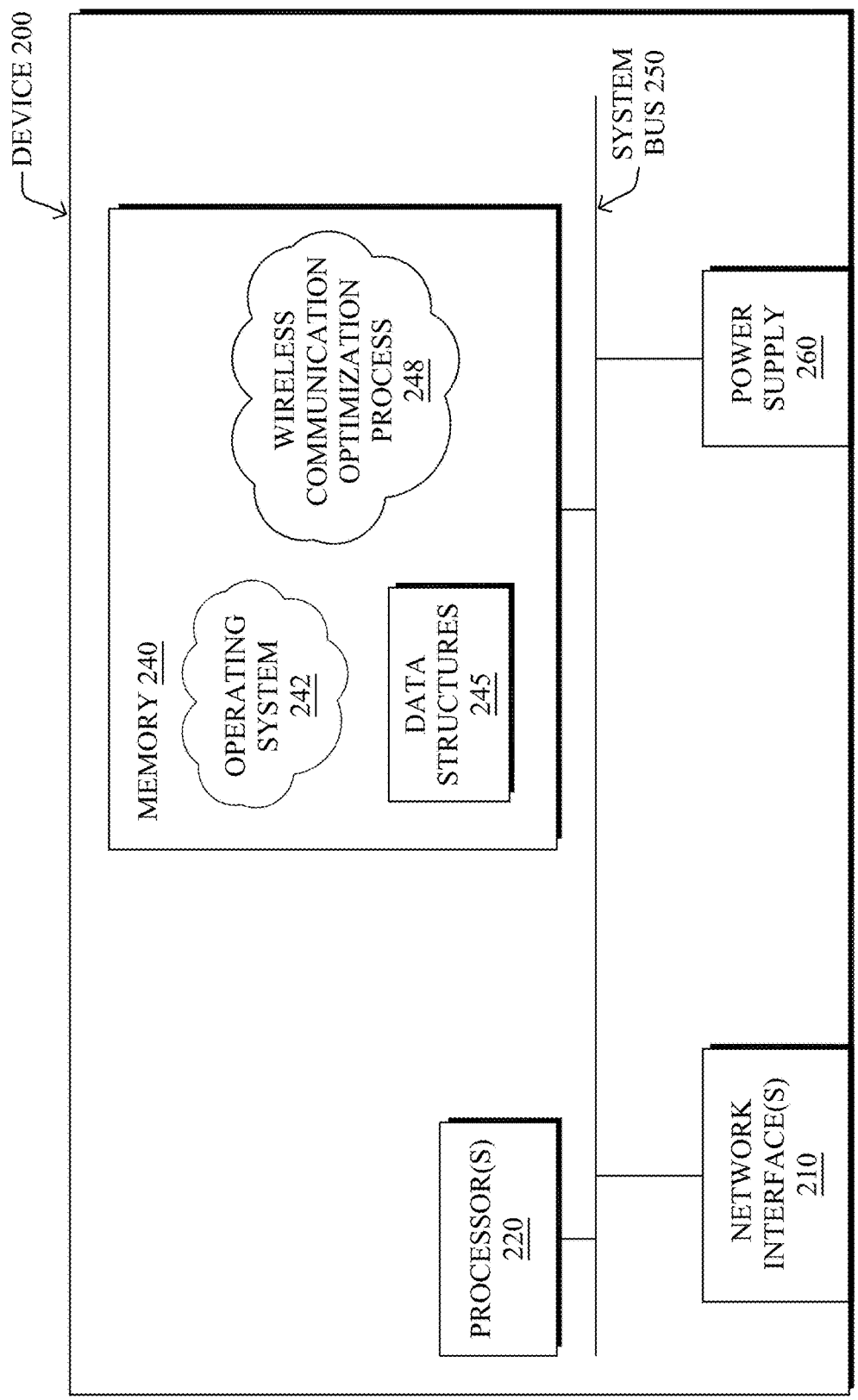
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative wireless communication optimization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, wireless communication optimization process 248 may utilize machine learning techniques, to monitor, analyze, and control device behavior in a wireless network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and controlling device behavior in a wireless network, a learning machine may construct a model of the observed behavior of a given client or type of client. Such a model can then be used in the wireless network to control the behavior of a device in a wireless network, such as a wireless access point (AP). Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of monitoring, analyzing, and controlling device behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and controlling device behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, wireless communication optimization process 248 may also use graph-based models for purposes of modeling and analyzing device behavior. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be used for purposes of modeling behavior in the network.

Figure 3:
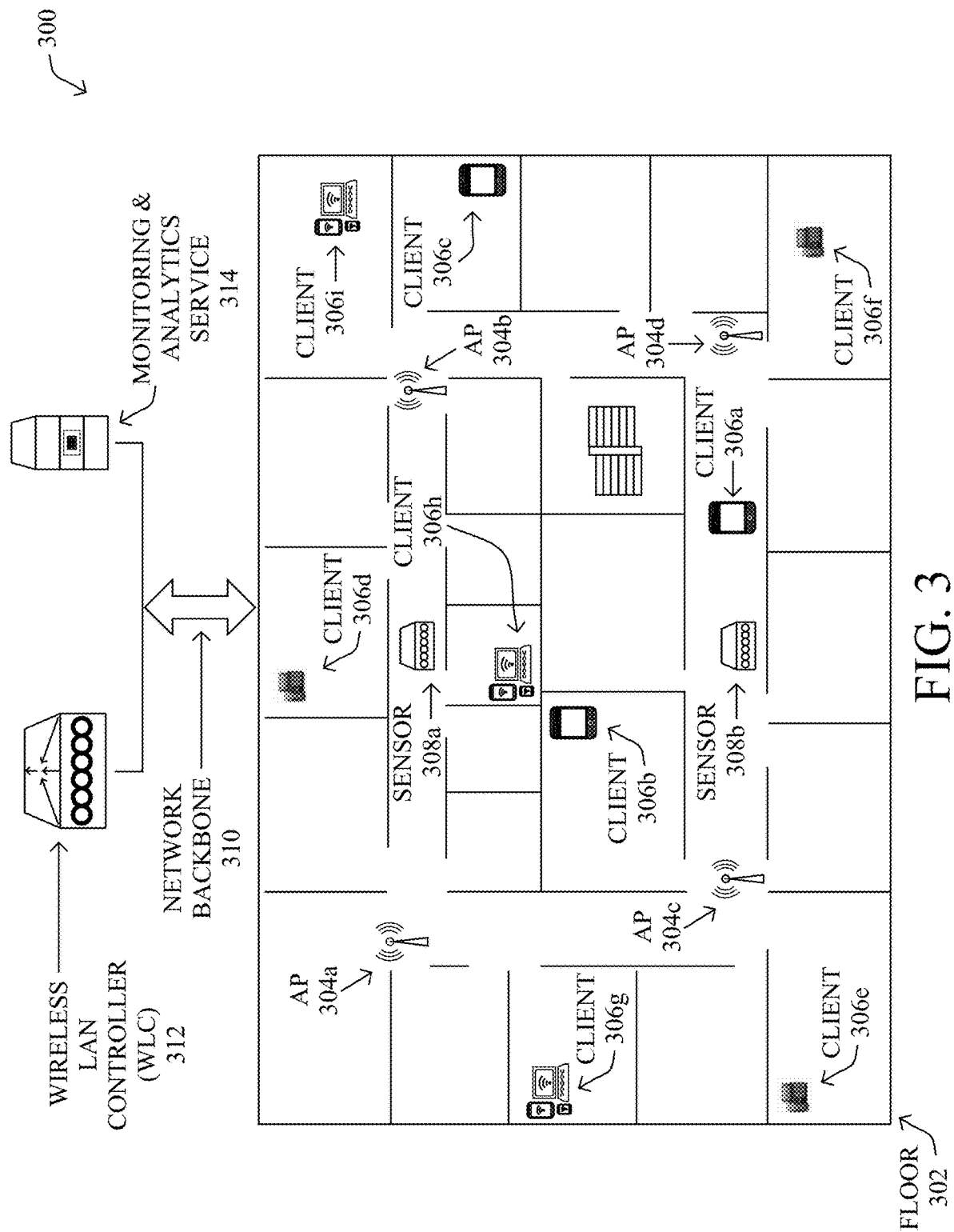
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless client devices 306 distributed throughout the location. For illustrative purposes, APs 304a-304d and client devices 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

In some embodiments, wireless network 300 may also include any number of wireless network sensors 308, such as sensors 308a-308b shown. In general, "wireless network sensors" are specialized devices that are able to act as wireless clients and perform testing on wireless network 300 and are not to be confused with other forms of sensors that may be distributed throughout a wireless network, such as motion sensors, temperature sensors, etc. In some cases, an AP 304 can also act as a wireless network sensor, by emulating a client in the network for purposes of testing communications with other APs. Thus, emulation points in network 300 may include dedicated wireless network sensors 308 and/or APs 304, if so configured.

During operation, the purpose of an emulation point in network 300 is to act as a wireless client and perform tests that include connectivity, performance, and/or negative scenarios, and report back on the network behavior to monitoring and analytics service 314. In turn, service 314 may perform analytics on the obtained performance metrics, to identify potential network issues before they are reported by actual clients. If such an issue is identified, service 314 can then take corrective measures, such as changing the operation of network 300 and/or reporting the potential issue to a network administrator or technician.

The types and configurations of clients 304 in network 300 can vary greatly. For example, client devices 306a-306c may be mobile phones, client devices 306d-306f may be office phones, and client devices 306g-306i may be computers, all of which may be of different makes, models, and/or configurations (e.g., firmware or software versions, chipsets, etc.). Consequently, each of client devices 306a-306i may behave very differently in wireless network 300 from both RF and traffic perspectives.

As noted above, industrial settings are particularly challenging when it comes to deploying a wireless network. Indeed, the presence and movement of machinery can lead to signal blockages, signal attenuation conditions, and the like. Wi-Fi deals with signal attenuation via automatic rate adaptation to a suitable datarate/modulation by trading off throughput in favor of packet success rate (PSR). Wi-Fi deals with a changing radio frequency (RF) environment via fast roaming and by providing roaming assistance to a client via. 802.11r, 802.11k and 802.11v, or other proprietary specified mechanisms. However, a typical Wi-Fi client may still lose one or more packets even with the above techniques and therefore may not meet the ultra-reliable low-latency communication (URLLC) reliability target of 99.9999% that is typical for industrial applications.

Modular, Reliable Wireless Client Device

The techniques herein a modular, client device that is capable of achieving very reliable wireless communications that is well-suited for use in industrial settings. In some aspects, the client makes uses of a plurality of radios, to support both spatial diversity and packet replication that are capable of meeting the URLLC needs of many industrial networks. In further aspects, the client device can make appropriate reliability vs. redundancy (cost) tradeoff and, at the same time, handle various deployment scenarios, such as operating in different bands with different Wi-Fi versions (802.11b/g/n/ac/ax), performing client radio co-ordination for efficiency, etc., while still providing ease-of-use and management.

Specifically, according to one or more embodiments of the disclosure as described in detail below, a client device having a plurality of radios obtains a list of basic service set identifiers (BSSIDs) for a plurality of wireless access points of a wireless network. The client device associates each of the plurality of radios of the client device with a different wireless access point of the wireless network, based on the obtained list of BSSIDs. The client device receives a copy of a data packet from a particular one of the associated wireless access points. Each of the associated wireless access points receives a replicated copy of the data packet to be transmitted towards the client device. The device causes the associated wireless access points to cease further transmission of their copies of the data packet by acknowledging receipt of the data packet to the particular wireless access point.

Illustratively, the techniques described herein may be performed by hardware, software, and/or firmware, such as in accordance with the wireless communication optimization process 248, which may include computer executable instructions executed by the processor 220 (or independent processor of interfaces 210) to perform functions relating to the techniques described herein.

Figure 4A:
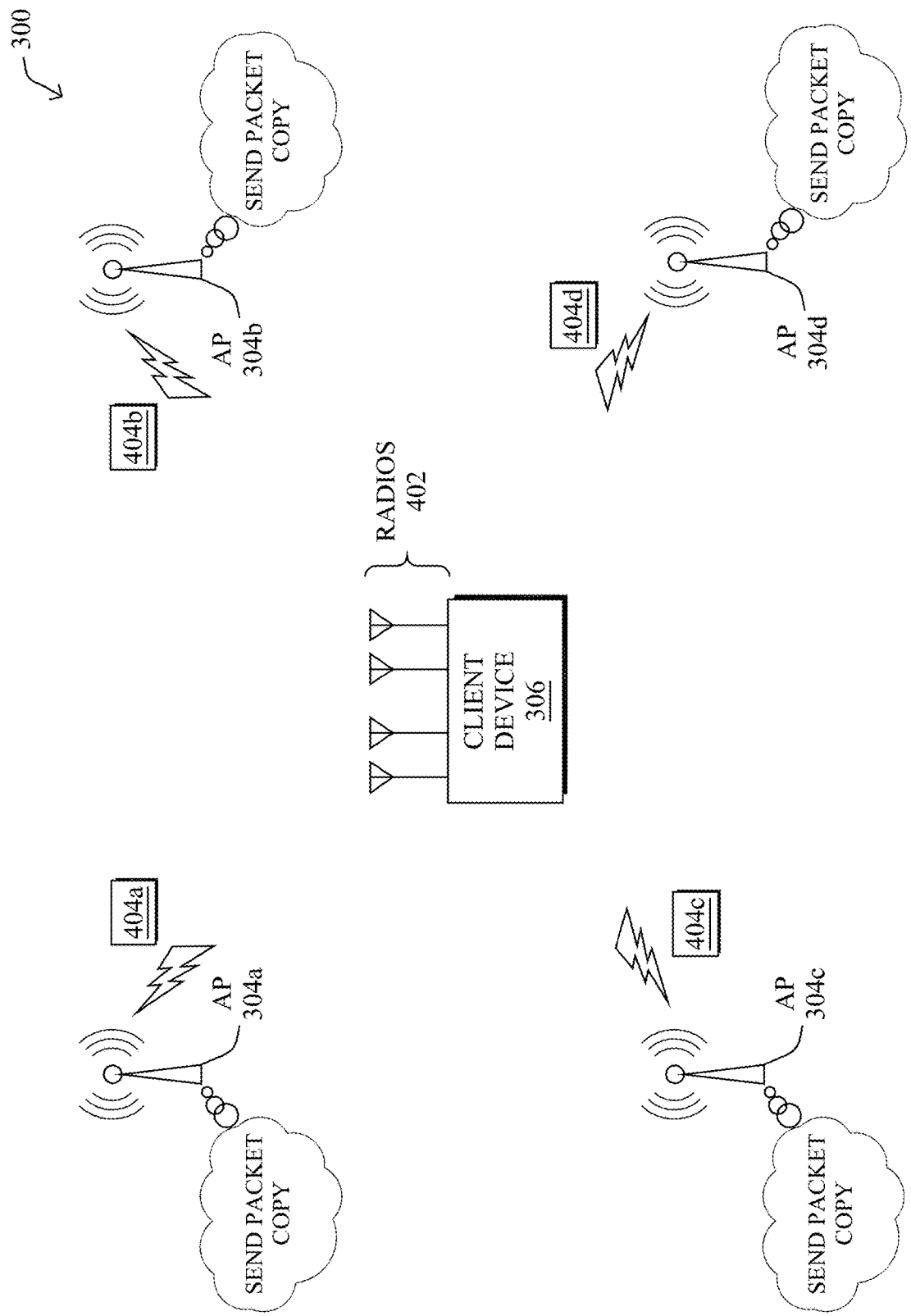
FIGS. 4A-4C illustrate examples of a modular, reliable wireless client device.
Figure 4B:
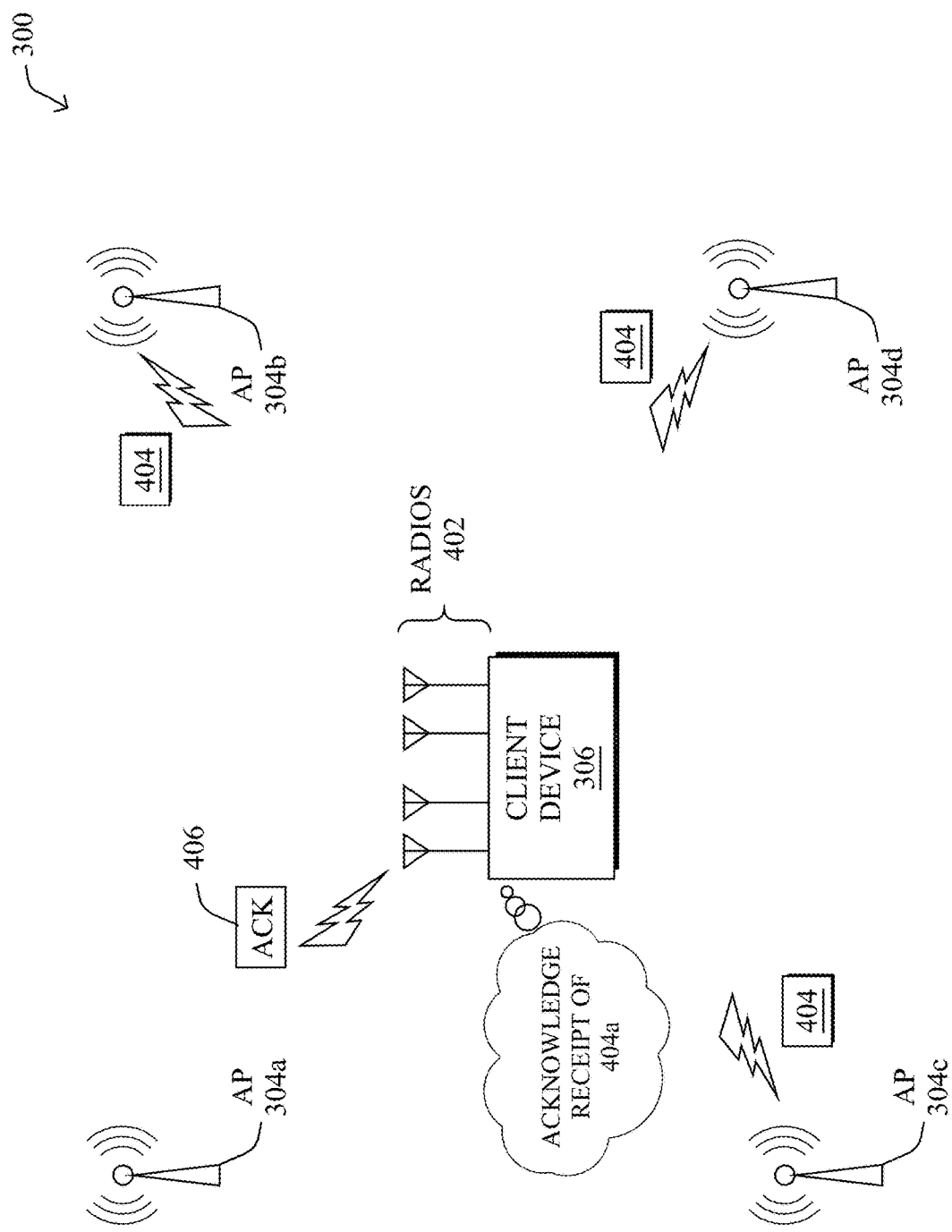
Figure 4C:
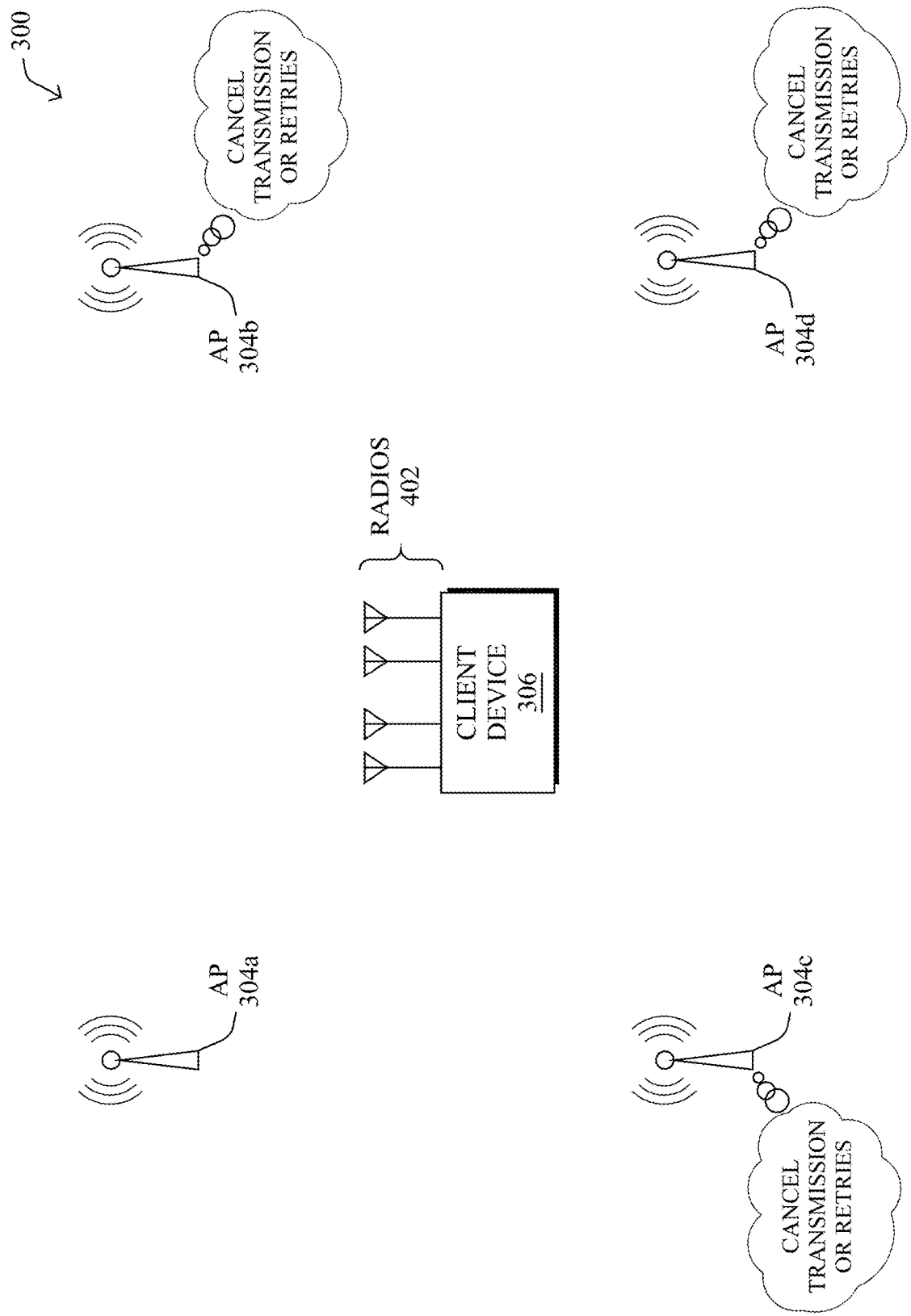

Operationally, FIGS. 4A-4C illustrate examples of a modular, reliable wireless client device, according to various embodiments. As shown in FIG. 4A, and continuing the example of FIG. 3, a wireless client device 306 may be configured to include a plurality of radios 402, to individually communicate with a wireless network, in various embodiments. In some embodiments, any or all of radios 402 may be modular in nature. For example, client 302 may support the ability to add or remove radios 402, as desired, up to a set amount (e.g., there may be four slots for up to four radio modules, etc.).

While client device 306 may take the form of any of the wireless client types described above (e.g., phones, computers, etc.), it is explicitly contemplated herein that device 306 may also take the form of a device typically found within an industrial environment. For example, client device 306 may take the form of an automated guided vehicle (AGV), an autonomous mobile robot (AMR), or the like.

Radios 402 may be of any suitable form of Wi-Fi client radio and may support any or all of the various Wi-Fi standards. For example, some or all of radios 402 may support 802.11b, 802.11g, 802.11n, 802.11ac, 802.11ax, combinations thereof, or the like. At a minimum, client device 306 may have at least two radios 402. However, a larger number of radios 402 will also increase the amount of reliability of its communications with the wireless network. Advantageously, the modular nature of radios 402 allows an end-user to reconfigure client device 306 to achieve the desired level of reliability in the deployment environment. For example, client device 306 may have two hard-set radios 402, as well as capacity to add two more radios 402.

During use, each of radios 402 may individually associate and communicate with a different AP in the wireless network 300. For example, a first one of radios 402 may associate and communicate with AP 304a, a second one of radios 402 may associate and communicate with AP 304b, a third one of radios 402 may associate and communicate with AP 304c, and a fourth one of radios 402 may associate and communicate with AP 304d. This allows client device 306 to communicate simultaneously with different APs 304 of wireless network 300.

To associate each of radios 402 with a different AP 304, client device 306 may perform media access control (MAC) coordination among radios 402. In some embodiments, this may entail client device 306 using radios 402 to perform off-channel scanning, potentially leveraging 802.11k and/or 802.11v information, in order to compile a master list of basic service set identifiers (BSSIDs) for the available APs 306. As would be appreciated, the BSSIDs of the APs 306 may take the form of MAC addresses or other unique identifiers.

In various embodiments, client device 306 may aggregate all of the BSSID information obtained by its radios 402 into a master list of BSSIDs of APs 306 with which client device 306 can associate. To avoid any disruption to the data traffic of client device 306, client device 306 may distribute the off-channel scanning for BSSID information across the N-number of its radios 402, so as to devote at least a subset of radios 402 to data traffic during the scanning (e.g., two or more of radios 402 may remain on-channel to support data traffic).

As noted, each of radios 402 of client device 306 may be individually associated with a different AP 304 of wireless network 300. In some embodiments, client device 306 may do so by using the same service set identifier (SSID) for wireless network 300 and selecting the best available APs/BSSIDs from its master list. For example, client device 306 may sort its list of BSSIDs based on their corresponding wireless metrics, such as received signal strength indicator (RSSI), signal to noise ratio (SNR), or the like. Client device 306 may also prune any outliers from eligibility for association, based on their wireless metrics. In turn, client device 306 may select, from the sorted list of BSSIDs, a number of the wireless access points with which the plurality of radios of the client are to associate that is equal to the number of radios of the client device. For example, as shown, client device 306 may select the top four BSSIDs/APs 304 and associate each of its radios 402 with a different AP 304.

According to various embodiments, once radios 402 have associated with the different APs 304a-304d, wireless network 300 and/or client device 306 can leverage packet replication, to improve on the reliability of any wireless communications. For example, assume that a data packet 404 is to be sent by wireless network 300 to client device 306. In such a case, the controller for APs 304a-304d (e.g., WLC 312) may replicate the packet via its Ethernet interface to each of APs 304a-304d. Each data frame communicated between client device 306 and wireless network 300 may also carry additional information, such as a sequence number and/or radioID of the corresponding radio 402, for purposes of de-duplication/elimination.

When client device 306 is to send a packet, it may replicate that packet on each of its radios 406 and include the sequence number and/or radioID of the transmitting radio 402. In turn, the controller for network 300 can use this information to eliminate any duplicate packets that are received via APs 304a-304d. For example, the controller may match the sequence numbers of the packets and eliminate any duplicates.

Downstream packets to client device 306 may similarly be replicated by wireless network 300 via APs 304a-304d. For example, AP 304a may send a first copy 404a of a data packet towards its associated radio 402 of client device 306, AP 304b may send a second copy 404b of the data packet towards its own associated radio 402 of client device 306, etc. Thus, client device 306 may receive up to four copies of the same data packet (e.g., copies 404a-404d), thereby increasing the chances significantly of client device 306 receiving at least one copy. In cases in which client device 306 receives multiple copies of a data packet, it may assess their sequence numbers, keep the first-received copy of the packet, and eliminate any duplicate copies having the same sequence number.

Note that packet replication can often cause problems in the case of client associations with poor link quality (e.g., with high packet loss). More specifically, high packet loss can lead to a large number of MAC level retries, which can overload the transmission queue/buffer of client device 306 and/or an AP 304. Packet replication can also exacerbate already congested links in wireless network 300 by consuming additional wireless channels and other resources.

To help improve the efficiency of the packet replication used herein, a number of modifications to the replication mechanism are also introduced. In some embodiments, a packet may only be replicated on a subset of the associated APs 304 and/or radios 402, based on their wireless metrics. For example, even though radios 402 may be associated with APs 304a-304d, the controller for wireless network 300 may opt to replicate a given data packet via APs 304a-304c only, if resources on AP 304d are low or the link between AP 304d and client device 306 are below one or more predefined thresholds (e.g., a poor SNR, RSSI, data rate, etc.).

In a further embodiment, once at least one copy of a given data packet is received, the receiver may cause the cessation of further transmissions or retransmission of that packet. For example, as shown in FIG. 4B, assume that client device 306 receives copy 404a of a data packet from AP 304a, first. In response, the radio 402 associated with AP 304a may return an acknowledgement (ACK) 406 to AP 304a. Doing so may then trigger APs 304a-304d to immediately cancel their original transmissions of that packet and/or any pending MAC retries, and releasing their associated buffers. A similar approach can be taken locally by client device 306 whereby any acknowledgement of a packet sent via any of radios 402 by an PA 304 will cease (re)transmission of that packet by the other radios 402 of client device 306.

To address the queue/buffer full problem on APs 304, acknowledgement 406 may include the highest sequence number (downstreamAckedSeqno) of a packet acknowledged by client device 306, which can then be shared with the other APs 304 (e.g., via the controller or directly). Consequently, as shown in FIG. 4C, the remaining APs 304*b*-304*d* may look at the specified downstreamAckedSeqno and immediately cancels any transmissions or retries for any packets in its queue/buffer up to downstreamAckedSeqno and discard all associated buffers, immediately. The AP 304 may also schedule transmission of any newly received data packet for transmission to client device 306 that has a sequence number higher than that of downstreamAckedSeqno.

When there are multiple client radios 402 with good coverage, client device 306 may similarly employ selective replication and/or load-balancing among radios 402 such that the overall throughput can be increased and latency reduced, beyond what a single client radio 402 operating on a single channel can provide. For example, if each of radios 402 have very good RSSI and/or SNR metrics with their associated APs 304, client device 306 may opt to only replicate a given packet via two or three of its radios 402.

Figure 5:
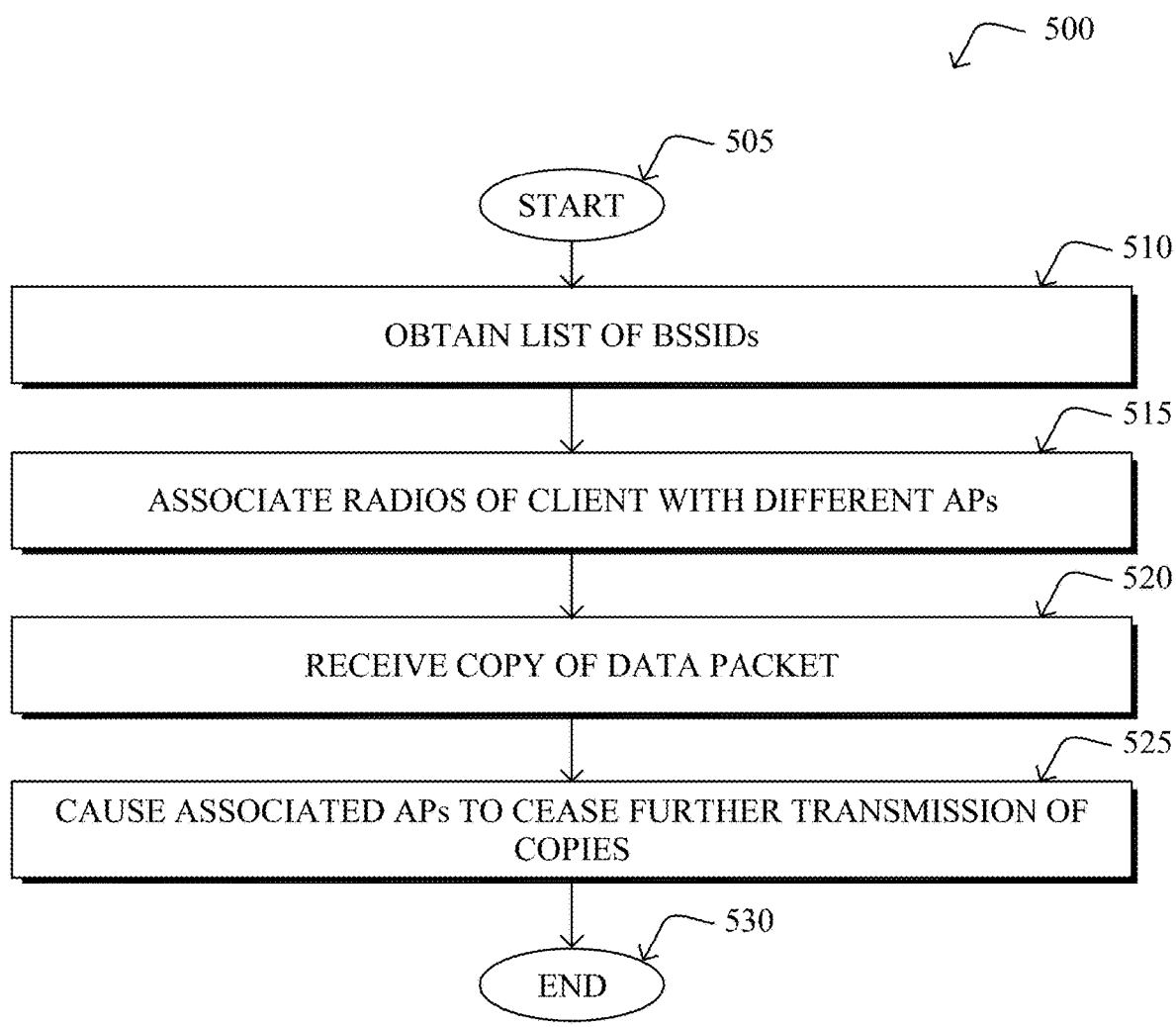
FIG. 5 illustrates an example simplified procedure for ensuring packet delivery to a client device.

FIG. 5 illustrates an example simplified procedure for ensuring packet delivery to a client device, in accordance with the embodiments herein. For example, a non-generic, specifically configured client device having a plurality of radios may perform procedure 500 by executing stored instructions. The procedure 500 may start at step 505, and continues to step 510, where, as described in greater detail above, the device may obtain a list of basic service set identifiers (BSSIDs) for a plurality of wireless access points of a wireless network. In some embodiments, the device may do so by performing, by each of its plurality of radios, off-channel scanning of the wireless network, to obtain BSSID information regarding one or more of the wireless access points. In turn, the device may aggregate the BSSID information obtained by the plurality of radios of the client device into the list of BSSIDs. In some embodiments, the device may also schedule the off-channel scanning by each of the radios of the client device such that two or more of the radios remain on-channel at any given time.

At step 515, as detailed above, the device may associate each of the plurality of radios of the client device with a different wireless access point of the wireless network, based on the obtained list of BSSIDs. For example, the device may sort the list of BSSIDs by received signal strength indicator (RSSI) or signal to noise ratio (SNR) metrics for their corresponding wireless access points and select, from the sorted list, a number of the wireless access points with which the plurality of radios of the client are to associate that is equal to the number of radios of the client device. In various embodiments, the associated access points may share the same SSID and use different BSSIDs.

At step 520, the device may receive a copy of a data packet from a particular one of the associated wireless access points, as described in greater detail above. In various embodiments, each of the associated wireless access points receives a replicated copy of the data packet to be transmitted towards the client device. For example, one or more wireless access point controllers (e.g., a WLC) may replicate the data packet to the access points associated with the various radios of the client device for transmission.

At step 525, as detailed above, the device may cause the associated wireless access points to cease further transmission of their copies of the data packet by acknowledging receipt of the data packet to the particular wireless access point. For example, the particular wireless access point may share a sequence number of the acknowledge data packet with the other wireless access points associated with the plurality of radios of the client device. In turn, the other wireless access points may clear packets awaiting transmission to the client device in their transmission buffers up to the shared sequence number. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a modular client device for a wireless network that exhibits improved reliability when communicating with a wireless network. In some aspects, the client may use multiple radios to associate with different access points of the wireless network, to leverage redundant packet transmissions. The radios may also be modular in nature, allowing for the number of radios of the client device to be selected as desired, depending on the deployment environment.

While there have been shown and described illustrative embodiments that provide for a modular, reliable wireless client device, it is to be understood that various other adaptations and modifications may be made within the spirit and scope of the embodiments herein. For example, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a client device having a plurality of radios, a list of basic service set identifiers (BSSIDs) for a plurality of wireless access points of a wireless network;
   associating, by the client device, each of the plurality of radios of the client device with a different wireless access point of the wireless network, based on the obtained list of BSSIDs, such that each of the plurality of radios of the client device individually communicates with a different one of the plurality of wireless access points of the wireless network, wherein the different wireless access points share a single service set identifier (SSID);

receiving, at the client device, a copy of a data packet from a particular one of the associated wireless access points, wherein each of the associated wireless access points receives a replicated copy of the data packet to be transmitted towards the client device; and causing, by the client device, the associated wireless access points to cease further transmission of their copies of the data packet by acknowledging receipt of the data packet to the particular wireless access point, wherein the particular wireless access point shares a sequence number of the acknowledge data packet with the other wireless access points associated with the plurality of radios of the client device, and wherein the other wireless access points clear packets awaiting transmission to the client device in their transmission buffers up to the shared sequence number.

2. The method as in claim 1, wherein obtaining the list of BSSIDs for the plurality of wireless access points of the wireless network comprises:

performing, by each of the plurality of radios, off-channel scanning of the wireless network, to obtain BSSID information regarding one or more of the wireless access points; and aggregating the BSSID information obtained by the plurality of radios of the client device into the list of BSSIDs.

3. The method as in claim 2, wherein performing the off-channel scanning of the wireless network comprises:

scheduling the off-channel scanning by each of the radios of the client device such that two or more of the radios remain on-channel at any given time.

4. The method as in claim 1, wherein associating, by the client device, each of the plurality of radios of the client device with a different wireless access point of the wireless network, based on the obtained list of BSSIDs, comprises:

sorting the list of BSSIDs by received signal strength indicator (RSSI) or signal to noise ratio (SNR) metrics for their corresponding wireless access points; and selecting, from the sorted list of BSSIDs, a number of the wireless access points with which the plurality of radios of the client are to associate that is equal to the number of radios of the client device.

5. The method as in claim 1, wherein a controller replicates copies of the next data packet for transmission to the client device to only a subset of the wireless access points associated with the client device.

6. The method as in claim 1, wherein one or more of the radios of the client device are modular radios.

7. The method as in claim 1, wherein the client device comprises an automated guided vehicle (AGV).

8. An apparatus comprising:

one or more network interfaces to communicate with a wireless network, wherein the one or more network interfaces comprise a plurality of radios;

a processor coupled to the network interfaces and configured to execute one or more processes; and a memory configured to store a process executable by the processor, the process when executed configured to:

obtain a list of basic service set identifiers (BSSIDs) for a plurality of wireless access points of a wireless network;

associate each of the plurality of radios of the apparatus with a different wireless access point of the wireless network, based on the obtained list of BSSIDs, such that each of the plurality of radios of the client device individually communicates with a different one of the plurality of wireless access points of the wireless network, wherein the different wireless access points share a single service set identifier (SSID);

receive a copy of a data packet from a particular one of the associated wireless access points, wherein each of the associated wireless access points receives a replicated copy of the data packet to be transmitted towards the apparatus; and cause the associated wireless access points to cease further transmission of their copies of the data packet by acknowledging receipt of the data packet to the particular wireless access point, wherein the particular wireless access point shares a sequence number of the acknowledge data packet with the other wireless access points associated with the plurality of radios of the client device, and wherein the other wireless access points clear packets awaiting transmission to the client device in their transmission buffers up to the shared sequence number.

9. The apparatus as in claim 8, wherein the apparatus obtains the list of BSSIDs for the plurality of wireless access points of the wireless network by:

performing, by each of the plurality of radios, off-channel scanning of the wireless network, to obtain BSSID information regarding one or more of the wireless access points; and aggregating the BSSID information obtained by the plurality of radios of the apparatus into the list of BSSIDs.

10. The apparatus as in claim 9, wherein performing the off-channel scanning of the wireless network comprises:

scheduling the off-channel scanning by each of the radios of the apparatus such that two or more of the radios remain on-channel at any given time.

11. The apparatus as in claim 8, wherein the apparatus associates each of the plurality of radios of the apparatus with a different wireless access point of the wireless network, based on the obtained list of BSSIDs, by:

sorting the list of BSSIDs by received signal strength indicator (RSSI) or signal to noise ratio (SNR) metrics for their corresponding wireless access points; and selecting, from the sorted list of BSSIDs, a number of the wireless access points with which the plurality of radios of the client are to associate that is equal to the number of radios of the apparatus.

12. The apparatus as in claim 8, wherein a controller replicates copies of the next data packet for transmission to the apparatus to only a subset of the wireless access points associated with the apparatus.

13. The apparatus as in claim 8, wherein one or more of the radios of the apparatus are modular radios.

14. The apparatus as in claim 8, wherein the apparatus comprises an automated guided vehicle (AGV).

15. A tangible, non-transitory, computer-readable medium storing program instructions that cause a client device having a plurality of radios to execute a process comprising:

obtaining, by the client device having a plurality of radios, a list of basic service set identifiers (BSSIDs) for a plurality of wireless access points of a wireless network;

associating, by the client device, each of the plurality of radios of the client device with a different wireless access point of the wireless network, based on the obtained list of BSSIDs, such that each of the plurality of radios of the client device individually communicates with a different one of the plurality of wireless access points of the wireless network, wherein the different wireless access points share a single service set identifier (SSID);

receiving, at the client device, a copy of a data packet from a particular one of the associated wireless access points, wherein each of the associated wireless access points receives a replicated copy of the data packet to be transmitted towards the client device; and causing, by the client device, the associated wireless access points to cease further transmission of their copies of the data packet by acknowledging receipt of the data packet to the particular wireless access point, wherein the particular wireless access point shares a sequence number of the acknowledge data packet with the other wireless access points associated with the plurality of radios of the client device, and wherein the other wireless access points clear packets awaiting transmission to the client device in their transmission buffers up to the shared sequence number.

* * * * *